(12) United States Patent
Ohkawa

(10) Patent No.: US 8,547,611 B2
(45) Date of Patent: Oct. 1, 2013

(54) IMAGE FORMING APPARATUS

(75) Inventor: Mieko Ohkawa, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 354 days.

(21) Appl. No.: 13/072,089

(22) Filed: Mar. 25, 2011

(65) Prior Publication Data
US 2011/0235129 A1 Sep. 29, 2011

(30) Foreign Application Priority Data

Mar. 29, 2010 (JP) ................................ 2010-074351

(51) Int. Cl.
*G03F 3/08* (2006.01)
*H04N 1/00* (2006.01)

(52) U.S. Cl.
USPC ............ 358/518; 358/1.9; 358/3.2; 358/3.26; 358/406; 358/504

(58) Field of Classification Search
USPC ................. 358/1.9, 1.13, 3.1, 3.2, 3.26, 1.16, 358/518, 521, 527, 406, 504
See application file for complete search history.

(56) References Cited

U.S. PATENT DOCUMENTS

| 2003/0174364 A1* | 9/2003 | Goto | 358/3.26 |
| 2007/0097439 A1* | 5/2007 | Yamada | 358/3.1 |
| 2011/0310420 A1* | 12/2011 | Ikeda | 358/1.13 |

FOREIGN PATENT DOCUMENTS

| JP | 2007-276323 A | 10/2000 |
| JP | 2007-264364 A | 10/2007 |
| JP | 4147676 B2 | 9/2008 |

OTHER PUBLICATIONS

Notification of Reasons for Refusal for Japanese Patent Application No. 2010-074351; Date of Mailing: Jul. 23, 2013, with English Translation.

* cited by examiner

*Primary Examiner* — Kimberly A Williams
(74) *Attorney, Agent, or Firm* — Cantor Colburn LLP

(57) ABSTRACT

An image forming apparatus includes: a storing section, an image forming section to form a measurement image to output a measurement chart, and a control section for inputting density information indicating densities at positions of the measurement image, to calculate a correction value corresponding to each position based on the density information, to store the value in association with an output condition including a screen condition indicating a screen processing at the time of outputting the chart, to determine the output condition of the image data, to read the value corresponding to the output condition, and to correct the image data based on the value, wherein the image forming section forms an image based on the corrected image data, and when no correction value corresponding to the screen condition of the input image data is stored in the storing section, the control section inhibits the correction from being executed.

11 Claims, 9 Drawing Sheets

FIG. 7

ADJUSTMENT  2009/11/20 13:29

REGISTER/DELETE DENSITY BALANCE ADJUSTMENT VALUE

REGISTERED ADJUSTMENT VALUE IS SELECTED IF USED SCREEN MATCHES

| No. | NAME OF ADJUSTMENT VALUE PROFILE | SETTING DATE | SCREEN | KIND OF SHEET | BASIS WEIGHT | |
|-----|----------------------------------|--------------|--------|---------------|--------------|---|
| 01 | aaaaa | xxxx/xx/xx xx:xx | Dot190 | ENAMEL PAPER | 105-135g/m² | INVALID |
| 02 | bbbbb | xxxx/xx/xx xx:xx | FM | FINE PAPER | 64-82g/m² | VALID |
| 03 | ccccc | xxxx/xx/xx xx:xx | Line100 | PLAIN PAPER | 64-74g/m² | VALID |
| 04 | ddddd | xxxx/xx/xx xx:xx | Dot190 | PLAIN PAPER | 64-74g/m² | VALID |
| 05 | | | | | | |
| 06 | | | | | | |
| 07 | | | | | | |
| 08 | | | | | | |
| 09 | | | | | | |
| 10 | | | | | | |

ADDITION/CORRECTION  
READ COLORIMETRIC DATA | MANUAL SETTING | CHANGE PROFILE NAME | REPLICATE | DELETE

TO PRINT MODE   PREVIOUS SCREEN

IMAGE FORMING APPARATUS

BACKGROUND

1. Field of the Invention

The present invention relates to an image forming apparatus.

2. Description of Related Art

In a conventional image forming apparatus of an electrophotographic system, a density ununiformity occurs in a main scanning direction due to various factors including: a lean or dart of a charger which electrically charges a photoreceptor; a distance deviation between the photoreceptor on which a latent image has been formed, and a development roller which develops the image using a developer such as toner; an unevenness of conveyance amount of the developer which is conveyed by the development roller; and a difference among reflectance ratios in the main scanning direction of a polygon mirror which reflects laser light from a light source to the photoreceptor. As a result, a density ununiformity occurs over an entire surface.

Japanese Patent Application Laid-open No. 2007-264364 describes a conventional image forming apparatus which forms a plurality of patches having the same gradation at different positions in a main scanning direction on a rotating image bearing member (photoreceptor), measures the patches by a sensor provided in a machine, and corrects a gradation such that the obtained values become desired values, in order to output an image having a good gradation.

Japanese Patent No. 4147676 describes a technique to create a calibration file which stores gradation characteristic data for correcting a gray level of a printed matter in association with an output condition such as a print resolution in order to output an image having an appropriate gray level depending on the output condition, to correct the gray level based on the gradation characteristic data corresponding to the output condition when printing is executed, and when no gradation characteristic data corresponding to the output condition exists, to perform correction using gradation characteristic data corresponding to the output condition which is closest to an actual output condition.

SUMMARY

Meanwhile, a degree of a density ununiformity over an entire surface varies depending upon screen processing with respect to an image to be output or upon an output condition such as a sheet to be output. Especially when a condition of the screen processing is changed, the degree of the density ununiformity sometimes becomes large.

Even when using the technique described in Japanese Patent Application Laid-open No. 2007-264364, since a correction γ table corresponding to an engine condition at that time is produced every certain time and the image is corrected based on this correction γ table irrespective of the output condition, the correction cannot be executed depending on the output condition of the output image, and an image quality cannot be improved.

When using the technique described in Japanese Patent No. 4147676, since the correction can be executed in view of the output condition of the output image, the image quality can be improved. However, since the output image is corrected all the time by using an auxiliary file even when no gradation characteristic data corresponding to the output condition of the output image exists, the corrected image sometimes becomes worse than the uncorrected image especially when no gradation characteristic data complying with the screen processing condition exists and the auxiliary file having a correction value which is different from an appropriate correction value is used. As a result, the image quality degrades in some cases.

In order to solve at least one of the abovementioned problems, according to one aspect of the present invention, there is provided an image forming apparatus including:

a storing section to store predetermined information, an image forming section to form a measurement image on a sheet to output a measurement chart, and a control section to receive inputs of a plurality of pieces of density information respectively indicating densities at a plurality of positions of the measurement image formed on the sheet, to calculate a correction value corresponding to each of the positions based on the input density information, to store in the storing section at least one calculated correction value in association with an output condition including a screen condition indicating a content of a screen processing at the time of outputting the measurement chart, to determine the output condition of the input image data, to read the correction value corresponding to the determined output condition from the storing section, and to correct the input image data based on the read correction value, wherein the image forming section forms an image on the sheet based on the corrected image data, and when no correction value corresponding to the screen condition of the input image data is stored in the storing section, the control section inhibits the correction corresponding to the input image data from being executed.

Preferably, the image forming apparatus further includes an informing section to inform that no correction value corresponding to the screen condition of the input image data is stored in the storing section.

Preferably, the number of the at least one correction value stored in the storing section is two or more, and the control section first selects at least one correction value corresponding to at least the screen condition of the input image data among the correction values stored in the storing section based on a determination result of the output condition of the input image data, and when the number of the at least one selected correction values is two or more, reads any of the correction values from the storing section and uses the read correction value for correction of the input image data.

Preferably, the output condition further includes a sheet condition indicating a kind of the sheet, and when the number of the at least one selected correction values is two or more, the control section reads from the storing section at least one correction value which further corresponds to the sheet condition of the input image data, and uses the read correction value for correction of the input image data.

Preferably, the control section stores at least one correction value together with at least one date-and-time information in the storing section, and when the number of the at least one correction data which is stored in the storing section and corresponds to the screen condition and the sheet condition of the input image data is two or more, reads the correction value which further corresponds to latest date-and-time information among the at least one date-and-time information from the storing section to use the read correction value for correction of the input image data.

Preferably, the control section stores the at least one correction value together with at least one date-and-time information in the storing section.

Preferably, the control section replicates the correction value stored in the storing section, and stores the replicated correction value in the storing section separately from the original correction value.

Preferably, the image forming apparatus further includes: an operating section which can be operated by a user, wherein the control section changes the correction value stored in the storing section in accordance with operation by the operating section.

Preferably, when the correction value whose output condition is same as the correction value stored in the storing section is newly stored in the storing section, the control section calculates a synthesized correction value by a predetermined calculation based on the correction value stored in the storing section and the correction value which is newly stored, and stores the calculated synthesized correction value in the storing section in association with the output condition.

Preferably, the control section selects whether the synthesized correction value should be overwritten on the correction value stored in the storing section or the synthesized correction value should be stored in the storing section separately from the correction value stored in the storing section in compliance with a predetermined request.

Preferably, the control section makes the image forming section form the measurement image and identification information capable of specifying the output condition on the sheet to output the measurement chart.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 7 is a diagram showing an example of an operation screen displayed when the correction value adjustment processing is executed;

DETAILED DESCRIPTION OF THE PREFERRED EMBODIMENT

An embodiment of the present invention will be described with reference to the drawings. The scope of the invention is not limited to the illustrated example.

Figure 1:
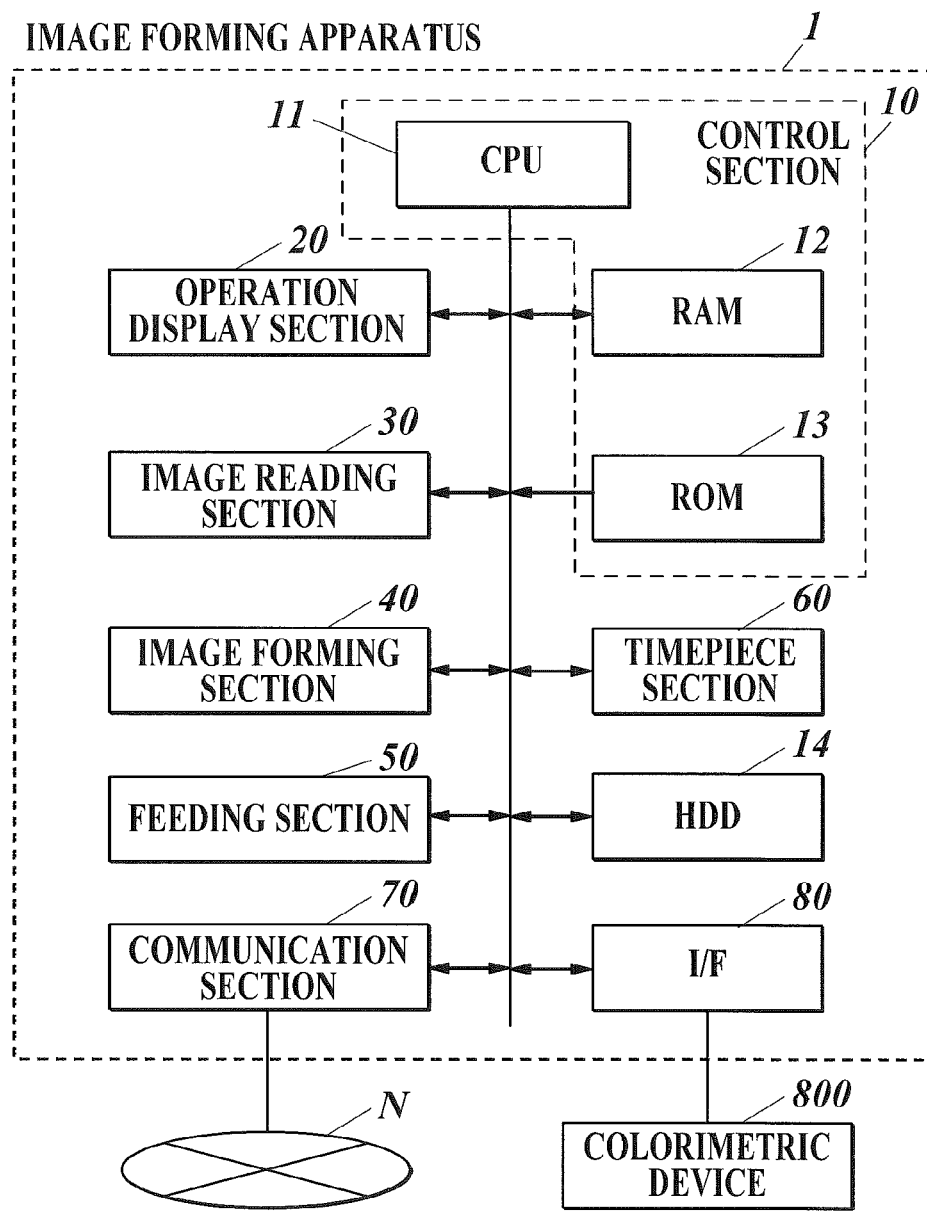
FIG. 1 is a block diagram showing a functional configuration of an image forming apparatus.

As shown in FIG. 1 for example, an image forming apparatus 1 includes a control section 10, a HDD (Hard Disk Drive) 14, an operation display section 20, an image reading section 30, an image forming section 40, a feeding section 50, a timepiece section 60, a communication section 70 and an I/F (Interface) 80.

The control section 10 includes a CPU (Central Processing Unit) 11, a RAM (Random Access Memory) 12 and a ROM (Read Only Memory) 13. Various processing programs are stored in the ROM 13. The CPU 11 reads the various programs stored in the ROM 13 to expand the programs in the RAM 12, and controls operations of various sections of the image forming apparatus 1 in accordance with the developed programs.

For example, when image data is input from the image reading section 30 or the communication section 70, the control section 10 executes various image processing for the input image data, outputs the same every page to the image forming section 40 to make the image forming section 40 form an image. The image processing includes: conversion processing of R, G, B image data input from the image reading section 30 into Y, M, C, K image data; and conversion processing of image data input from a host apparatus (not shown) through the communication section 70 into Y, M, C, K image data having data format which can be image-formed in the image forming apparatus 1 using a predetermined page description language, for example.

The HDD 14 as one aspect of a storage section stores various data in accordance with instructions from the control section 10. For example, the HDD 14 stores image data of a measurement chart to be output for correcting a density ununiformity over an entire surface, and a file including a correction value for correcting the density ununiformity over the entire surface.

The operation display section 20 as one aspect of an operating section includes an LCD (Liquid Crystal Display), a touch panel and a numeric keypad, for example. The operation display section 20 having such structure receives a display signal from the control section 10 to display the same on the LCD, and outputs an operation signal input from the touch panel or the numeric keypad to the control section 10.

The image reading section 30 includes an ADF (Auto Document Feeder), a platen glass, a CCD (Charge Coupled Device) and a light source. The image reading section 30 reads an image of an original document as R, G, B signal by forming a reflected light image with the CCD, which light is irradiated from the light source and scanned on the document supplied by the ADF or on the document set at a predetermined position, and by executing photoelectric conversion, and converts the read analog image signal into R, G, B image data to output the data. The output image data is subjected to predetermined image processing, and converted into YMCK data and sent to the image forming section 40.

The image forming section 40 includes an image forming unit, a conveying section for conveying a sheet fed from the feeding section 50, and a fixing section for fixing a toner image transferred to the sheet.

The image forming unit includes a photoreceptor dram, a charger, a laser light source and a transferring section. The photoreceptor dram of the image forming unit is rotated, its surface is charged by the charger, and the surface is exposed to light of the laser light source so that a latent image of an image is formed on the charged portion. The latent image portion is developed by a developing device, and a toner image is formed. The toner image is transferred to the sheet, which has been conveyed by the conveying section, by the transferring section. The sheet on which the toner image is transferred is subjected to fixing processing by the fixing section, and is discharged outside of the apparatus.

The feeding section 50 includes a plurality of feeding trays. Each feeding tray holds previously identified kind of sheets, and the sheets are supplied to the conveying section one by one from the uppermost sheet.

The timepiece section 60 outputs current date and time information in accordance with predetermined date and time acquisition request.

The communication section 70 is an interface which can be connected to a transmission medium connected to a communication network N such as a LAN (Local Area Network) and a WAN (Wide Area Network). The communication section 70 includes a communication control card such as a LAN card, and performs transmission/reception of various pieces of data to/from an external apparatus such as a host apparatus connected to the communication network N through a communication line with respect to a LAN cable.

The I/F 80 is an interface of a USB (Universal Serial Bus) standard for example, and connected to a peripheral device through a predetermined cable. In this embodiment, the I/F 80 is connected to a colorimetric device 800 which measures density of an image formed on the measurement chart.

Figure 2:
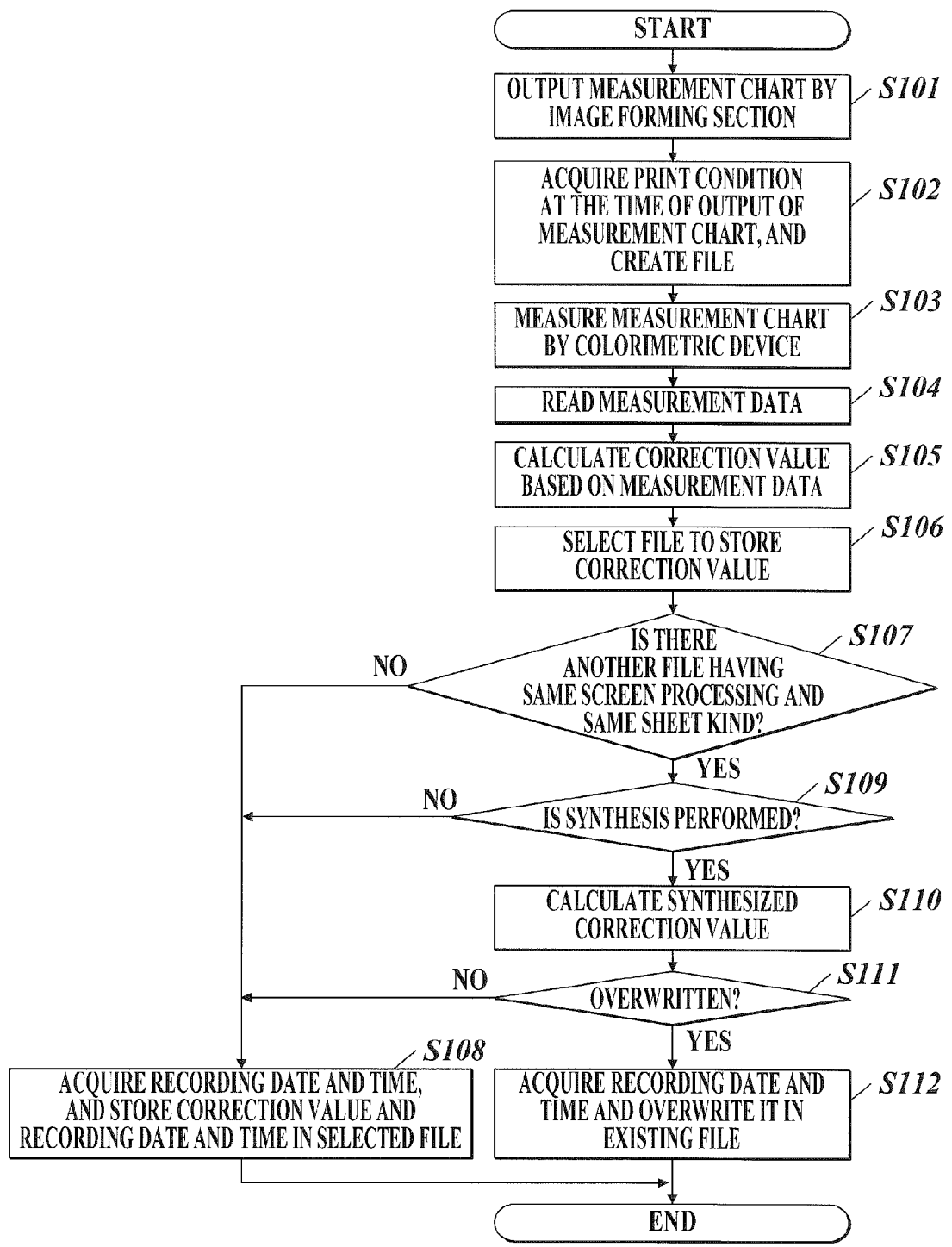
FIG. 2 is a flowchart showing a procedure for creating a correction value for correcting a density ununiformity over an entire surface.

Next, a procedure for acquiring the correction value for correcting the density ununiformity over an entire surface in the embodiment will be described with reference to FIG. 2.

Figure 6:
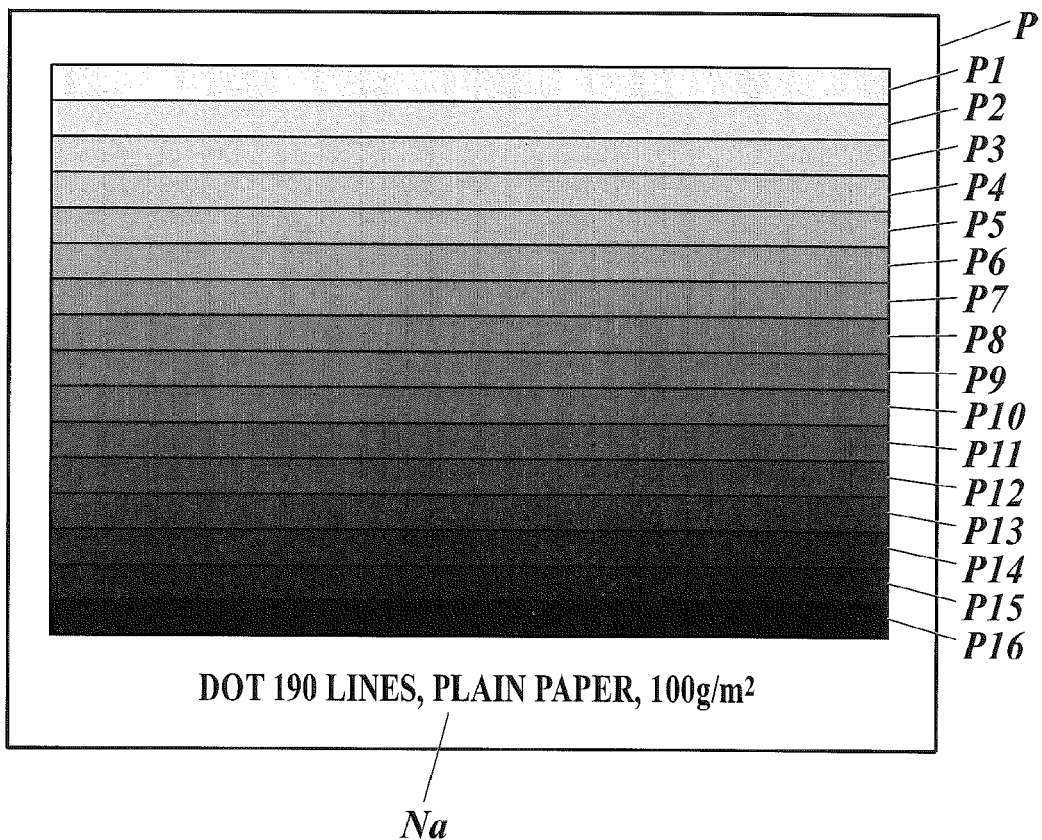
FIG. 6 is a diagram for explaining a measurement chart.

First, the measurement chart formed on the sheet on which a measurement image is formed by the image forming section 40 is output (Step S101). Specifically, as shown in FIG. 6, a plurality of belt-like images P1 to P16 extending in a main scanning direction are formed respectively in preset gradations on a sheet P. The belt-like images P1 to P16 are continuously disposed such that output gradation is increased with each of 16 gradations toward an end of the sheet. The measurement chart is composed of belt-like images in yellow color, for example. Also each of the respective measurement charts for magenta color, cyan color, and black color is formed on one sheet to be output. When the measurement chart is output, a user operates the operation display section 20 to make the measurement image of the measurement chart subjected to the screen processing, and to select a kind of sheet to be output. The screen processing includes setting of the number of lines, line screen processing, dot screen processing, error diffusing processing, FM screen processing, and AM screen processing. The kind of sheet includes thick paper, gloss coated paper, plain paper, and fine paper. Below the belt-like images P1 to P16, a print condition Na including a content of the screen processing at the time of outputting, the kind of sheet and a basis weight is printed as identification information so that the print condition when outputting the measurement chart can easily be recognized.

Next, the control section 10 acquires the print condition including the kind of screen processing and the kind of selected sheet which have been set in Step S101, creates a file in a new region in the HDD 14, and records the acquired print condition in the created file (Step S102). As described below, this file is for storing the correction value calculated based on a measurement value of a measurement image measured by the colorimetric device 800, in association with the print condition.

Next, the measurement chart is measured by the colorimetric device 800 (Step S103). Specifically, the colorimetric device 800 reads one by one the respective measurement charts of yellow color, magenta color, cyan color and black color which have been output by the image forming section 40, and measures the respective densities of the belt-like images P1 to P16. At that time, the colorimetric device 800 measures the image densities at a plurality of locations (e.g., 32 locations) in the main scanning direction of each the belt-like images.

Next, the colorimetric device 800 outputs the measurement data based on information of the image densities measured by the colorimetric device 800 to the image forming apparatus 1, and the control section 10 reads the measurement data (Step S104).

The control section 10 calculates the correction value based on the read measurement data (Step S105). Specifically, the control section 10 obtains an average value of the image densities measured at the plurality of locations in the main scanning direction for each of the gradations and for each of the colors, and obtains the correction value by calculating an error between the average value and each of the image densities measured at the respective measurement positions.

Then the control section 10 selects a file for recording the calculated correction value in accordance with operation of the operation display section 20 by a user (Step S106). The file created in Step S102 may be highlighted so that a user can easily select a file, for example. A file created in Step S102 may also be automatically selected.

Next, the control section 10 determines whether or not another file having the same kind of screen processing and the same kind of sheet as those of the selected file is stored in the HDD 14 (Step S107). When the control section 10 does not determine that the another file having the same kind of screen processing and the same kind of sheet as those of the selected file is stored in the HDD 14, i.e., when no file having the same kind of screen processing and the same kind of sheet as those of the selected file exists (Step S107: NO), the control section 10 acquires current date-and-time information from the timepiece section 60, and stores the correction value calculated in Step S105 together with the acquired date-and-time information in the file selected in Step S106 in the HDD 14 (Step S108). Then, this processing ends. In other words, the correction value calculated based a density measurement result by the colorimetric device 800 is stored in the HDD 14 in association with the print condition when outputting the measurement chart.

In Step S107, when the control section 10 determines that the another file having the same kind of screen processing and the same kind of sheet as those of the selected file is stored in the HDD 14 (Step S107: YES), the control section 10 determines whether or not the correction value recorded in the another file and the correction value calculated in Step S105 should be synthesized (Step S109). Specifically, whether or not the correction values should be synthesized is determined based on an operation of the operation display section 20 by a user. When the control section 10 determines that the correction values should be synthesized (Step S109: YES), the control section 10 calculates a synthesized correction value between the correction value recorded in the another file and the correction value calculated in Step S105 (Step S110). Concretely, the control section 10 obtains a weighted average of the correction value recorded in the another file and the correction value calculated in Step S105 to calculate the synthesized correction value. As the weighting method, the correction value recorded in the another file is weighted by 30%, and the correction value calculated in Step S105 is weighted by 70%, for example. The weighting method can appropriately be set. Another method may be used for calculating the synthesized correction value. On the other hand, when the control section 10 does not determine that the correction values should be synthesized in Step S109 (Step S109: NO), the control section 10 executes the processing in Step S108. In other words, HDD 14 stores a plurality of files which include the same print conditions as one another, and which includes different recording dates and times and different correction values from one another. The correction value calculated in Step S105 may not be stored separately from the another file, and may be overwritten on the another file.

The control section 10 determines whether or not the synthesized correction value calculated in Step S110 should be overwritten on the another file (Step S111). When the control section 10 determines that the synthesized correction value should be overwritten on the another file (Step S111: YES), the control section 10 acquires the current date-and-time information from the timepiece section 60, and overwrites this information and the synthesized correction value calculated in Step S110 on the another file (Step S112). Then this processing ends. In other words, only the latest correction value in the same print condition is stored in the HDD 14.

When the control section 10 does not determine that the correction value should be overwritten on the another file (Step S111: NO), the processing in the Step S108 is executed. In other words, the HDD 14 stores a plurality of files which includes the same print conditions as one another, and which includes different recording dates and times and different correction values from one another.

Figure 3:
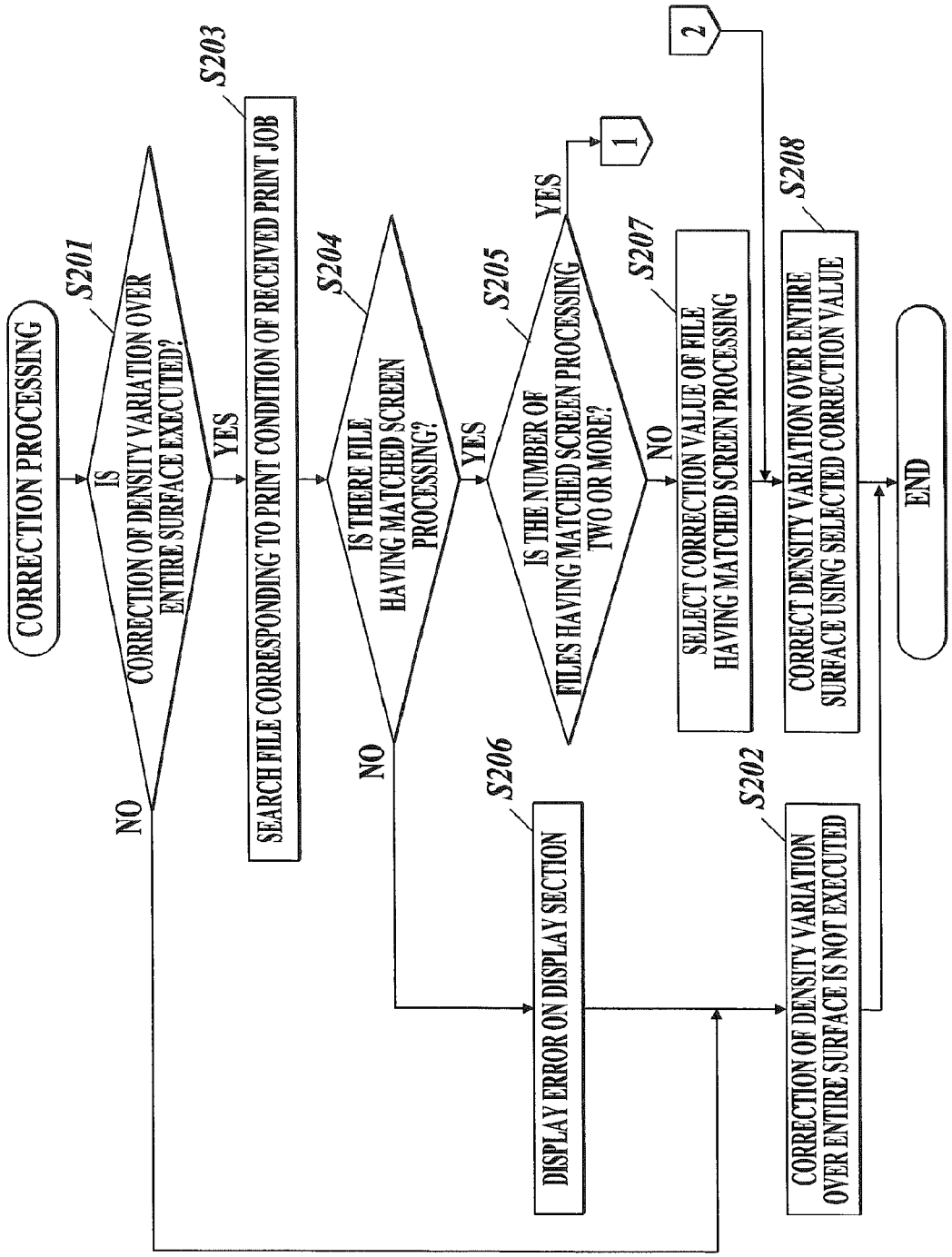
FIG. 3 is a flowchart for explaining correction processing to be executed in an image processing apparatus.
Figure 4:
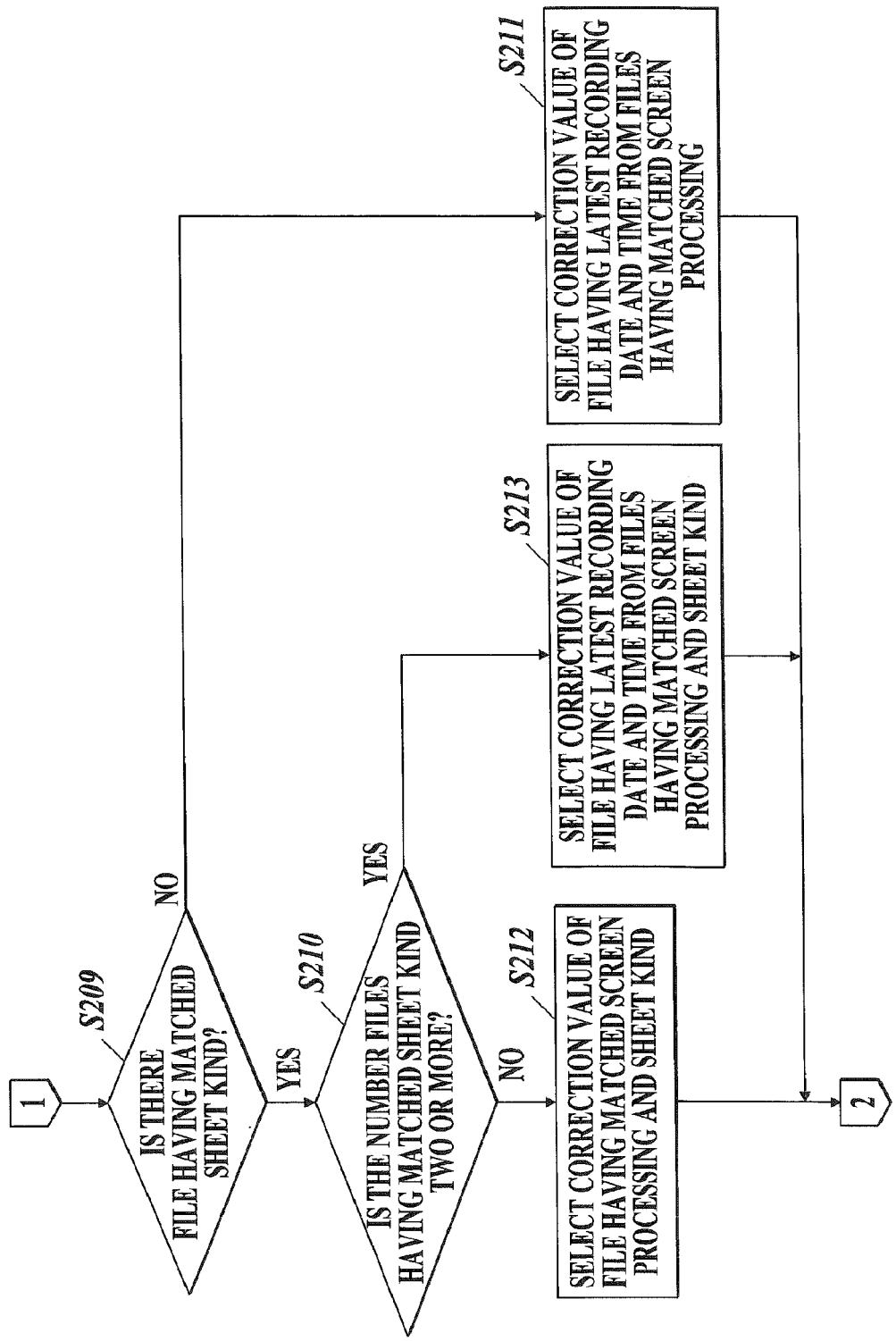
FIG. 4 is a flowchart for explaining the correction processing to be executed in the image processing apparatus.

Next, a correction processing to be executed by the image forming apparatus 10 will be described with reference to FIGS. 3 and 4. This processing is executed when the control section 10 receives execution of a print job by an operation of the operation display section 20, or when the control section 10 receives execution of a print job sent from outside through the communication section 70.

First, the control section 10 determines whether or not correction of the density ununiformity over an entire surface should be executed (Step S201). Specifically, the control section 10 determines whether or not to execute the correction based on a selecting operation by the operation display section 20 or job data of a print job sent from outside through the communication section 70.

When the control section 10 does not determine that the density ununiformity over an entire surface should be corrected (Step S201: NO), the control section 10 does not especially execute the correction of image data included in the job data contained in the print job to be executed (Step: S202), and this processing ends. When the control section 10 determines that the density ununiformity over an entire surface should be corrected (Step S201 YES), the control section 10 searches from the HDD 14 the file corresponding to the print condition of the received print job (Step S203). Specifically, the control section 10 specifies the kind of screen processing and the kind of sheet to be output based on the selecting operation by the operation display section 20 or the job data of the print job, and searches from the HDD 14 whether or not an appropriate file exists on the basis of the specified kind of screen processing and the specified kind of sheet to be output.

Then, the control section 10 determines whether or not the file including a matched kind of screen processing exists, on the basis of search of the file (Step S204). When the control section 10 determines that the file including the matched kind of screen processing exists (Step S204: YES), the control section 10 determines whether or not the number of the files which have the matched kind of screen processing is two or more (Step S205). On the other hand, when the control section 10 does not determine that the file including the matched kind of screen processing exists, i.e. when no file including the matched kind of screen processing exists (Step S204: NO), the LCD of the operation display section 20 functions as an informing section to display an error indication on a display screen of the LCD, and informs that no appropriate correction value exists (Step S206). When displaying the error indication, or in place of the error indication, a user may be informed of the error by outputting a warning sound or by lighting up an LED (Light-Emitting Diode). After executing Step S206, the processing in Step S202 is executed, and this processing ends. In other words, when the HDD 14 does not store the correction value including the matched kind of screen processing, since the density ununiformity over an entire surface can not appropriately be corrected, this fact is displayed and the correction of the density ununiformity are not executed. As a result, by correcting the density ununiformity over an entire surface based on a correction value included in another file, an output image quality can be prevented from being deteriorated. Moreover, when a user sees the error indication, a user can make an optimum correction value newly produced so that the print job can be executed again.

When the control section 10 does not determine that the number of the files which have the matched kind of screen processing is two or more, i.e. when only one file including the matched kind of screen processing exists (Step S205: NO), the control section 10 selects the correction value contained in the file including the matched kind of screen processing (Step S207), and executes the correction of the density ununiformity over an entire surface using the selected correction value (Step S208). In other words, the control section 10 executes the correction by adding/subtracting the correction value to/from a gradation value of an image to be output for each of colors, for each of gradations, and for each of image output positions. By this, the density ununiformity over an entire surface can be properly corrected in accordance with the screen processing provided to the output image. Thus, it is possible to suppress the deterioration of an image quality. After the control section 10 executes the processing in Step S208, this processing ends.

When the control section 10 determines in Step S205 that the number of the files which have the matched kind of screen processing is two or more (Step S205: YES), the control section 10 determines whether or not there is a file including the matched kind of sheet (sheet kind) among the files including the matched kind of screen processing (Step S209). When the control section 10 determines that there is the file including the matched sheet kind (Step S209: YES), the control section 10 determines whether or not the number of the files which have the matched sheet kind among the files which have the matched kind of screen processing is two or more (Step S210). On the other hand, when the control section 10 does not determine that there is the file including the matched sheet kind (Step S209: NO), the control section 10 selects a correction value included in a file of a latest recording date and time from the plurality of files including the matched kind of screen processing (Step S211), shifts to processing in Step S208, and corrects the density ununiformity over an entire surface using the selected correction value. By this, the density ununiformity over an entire surface can be appropriately corrected in accordance with the screen processing provided to the output image. In addition, since the correction is performed using the correction value based on an approximate density measurement value, the correction is executed in view of a current state of the image forming apparatus 1, and thereby the image quality is further improved.

When the control section 10 does not determine in Step S210 that the number of the files which have the matched sheet kind among the files which have the matched kind of screen processing is two or more, i.e. only one file including the matched sheet kind exists (Step S210: NO), the control section 10 selects the correction value included in the file including the matched kind of screen processing and the matched sheet kind (Step S212), shifts to the processing in Step S208, and corrects the density ununiformity over an entire surface using the selected correction value. By this, since the density ununiformity over an entire surface can appropriately be corrected in accordance with the screen processing provided to the output image and the kind of output sheet, it is possible to further improve the image quality.

On the other hand, when the control section 10 determines in Step S210 that the number of the files which have the matched sheet kind among the files which have the matched kind of screen processing is two or more (Step S210: YES), the control section 10 selects the correction value included in the file of the latest recording date and time from the plurality of files including the matched kind of screen processing and matched sheet kind (Step S213), shifts to processing in Step S208, and corrects the density ununiformity over an entire surface using the selected correction value. By this, the density ununiformity over an entire surface can appropriately be corrected in accordance with the screen processing provided to the output image and the kind of output sheet, and the correction is executed using the correction value based on the approximate measurement value. Thus, the correction is performed in view of the current state of the image forming apparatus 1, and thereby the image quality can further be improved.

Figure 5:
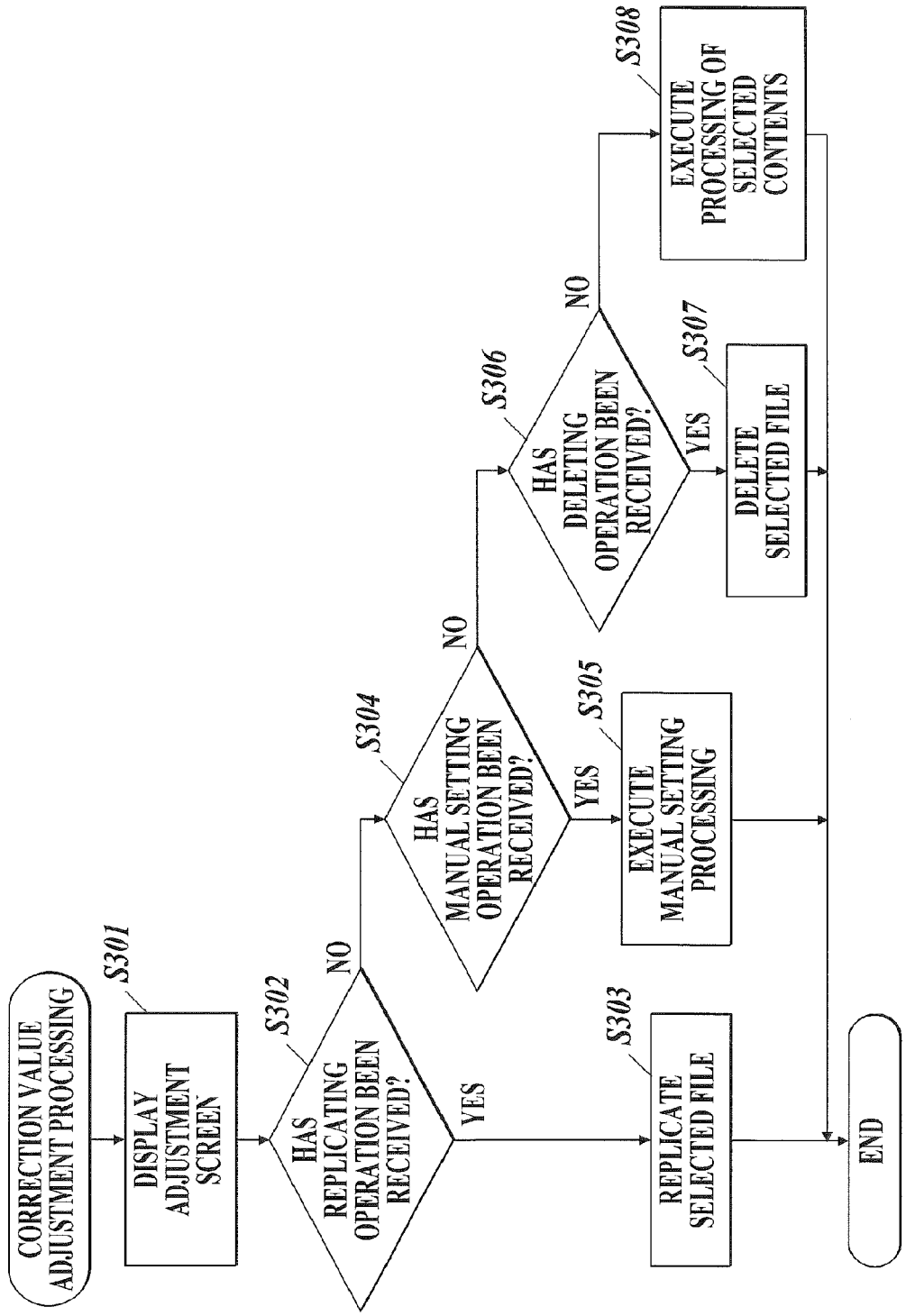
FIG. 5 is a flowchart for explaining correction value adjustment processing to be executed in the image processing apparatus.

Next, a correction value adjustment processing to be executed in the image forming apparatus 10 will be described with reference to FIG. 5. This processing is executed when the control section 10 receives a shifting operation to a predetermined correction value adjusting mode by the operation display section 20.

First, the control section 10 displays an adjustment screen as shown in FIG. 7 on a display region of the LCD of the operation display section 20 (Step S301).

The control section 10 determines whether or not a replicating operation has been received (Step S302). Specifically, the control section 10 determines whether or not a "Replication" button B has been pushed after a file to be replicated has been selected from a file list A by the touch panel of the operation display section 20. When the control section 10 determines that the replicating operation has been received (Step S302: YES), a replication of the selected file is newly created and stored in the HDD (Step S303), and this processing ends. By this, a user can finely adjust the correction value by later-described manual setting of the correction value while maintaining original data of the correction value. Thus, the user can repeatedly finely adjust the correction value, and the convenience is enhanced.

Figure 8:
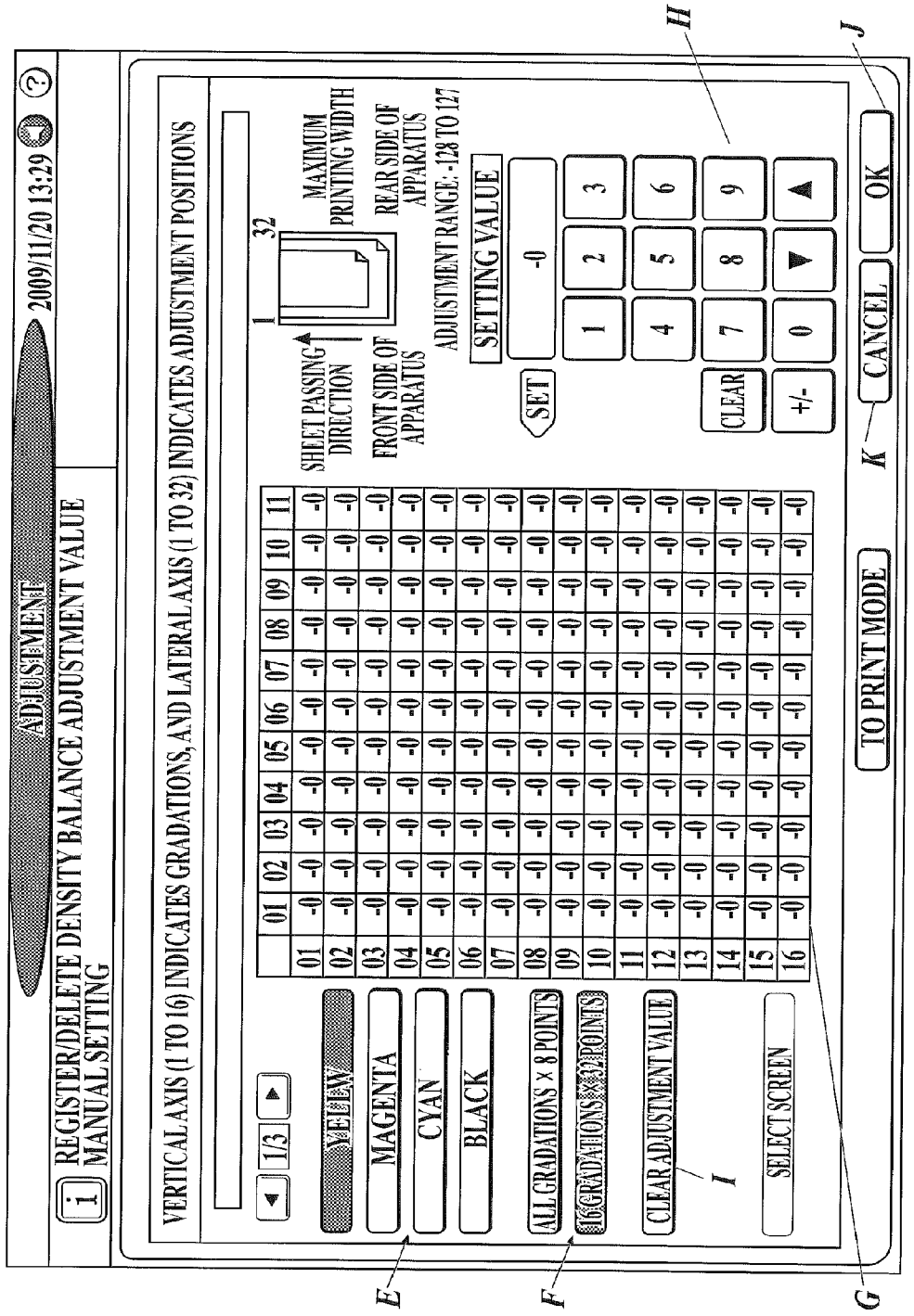
FIG. 8 is a diagram showing an example of the operation screen displayed when the correction value adjustment processing is executed.

On the other hand, when the control section 10 does not determine that the replicating operation has been received in Step S302 (Step S302: NO), the control section 10 determines whether or not an operation of manual setting has been received (Step S304). Specifically, the control section 10 determines whether or not a "Manual setting" button C has been pushed after selecting a file whose correction value should finely be adjusted from the file list A by the touch panel of the operation display section 20. When the control section 10 determines that the manual setting operation has been received (Step S304: YES), a fine adjusting operation screen of the correction value as shown in FIG. 8 is displayed on the display region of the LCD of the operation display section 20, and the manual setting processing for changing the correction value for each of colors, for each of gradations, and for each of image forming positions is executed by the operation of the touch panel (Step S305). A user can execute various adjusting operations while seeing the fine adjusting operation screen of the correction value. In other words, a user operates color buttons E provided on a left side on the screen, selects any of yellow color, magenta color, cyan color and black color, operates an adjusting method-selecting button F to determine the adjusting method of the correction value. The user selects any correction location from data blocks G, operates the numeric keypad H provided on a right side on the screen, and can change the correction value at the selected correction location. When the user operates an adjustment value clear button I, the correction value is reset to the pre-change value. When an "OK" button J provided on a right lower portion on the screen is operated when the change of the correction value is completed, the correction value in the selected file is overwritten, and the manual setting processing ends. Here, it is also possible to suspend the manual setting processing by pushing a "cancel" button K. The changed correction value may not be overwritten, and a new file may be created and stored in the HDD 14.

When the control section 10 does not determine that the manual setting operation has been received in Step S304 (S304: NO), the control section 10 determines whether or not a deleting operation has been received (Step S306). Specifically, the control section 10 determines whether or not a "Delete" button D has been pushed after selecting a file to be deleted from the file list A by the touch panel of the operation display section 20. When the control section 10 determines that the deleting operation has been received (Step S306: YES), the selected file is deleted from the HDD 14 (Step S307), and this processing ends. On the other hand, when the control section 10 does not determine that the deleting operation has been received in Step S306 (Step S306: NO), the control section 10 executes processing corresponding to another operation contents (Step S308). For example, it is possible to select whether or not a file should be searched in the above-described correction processing (see FIG. 3) by operating a valid/invalid button L provided on a right end portion of the file list A. After the control section 10 executes Step S308, this processing ends.

As described above, according to the embodiment, the image forming section 40 forms the belt-like images P1 to P16 on the sheet P and outputs the measurement chart. The control section 10 inputs the plurality pieces of density information indicating the densities at the respective positions in each of the belt-like images P1 to P16. The control section 10 calculates the correction values respectively corresponding to the positions based on the input density information. The control section 10 stores the calculated correction value so as to be correlated to the output condition which includes the screen condition indicating the screen processing content at the time of outputting the measurement chart, in the HDD 14. The control section 10 determines the output condition of the input image data. The control section 10 then reads the correction value corresponding to the determined output condition from the HDD 14. After that, the control section 10 corrects the input image data based on the read correction value. The image forming section 40 forms the image on the sheet based on the corrected image data. When the correction value corresponding to the screen condition of the input image data is not stored in the HDD 14, the control section 10 inhibits the correction corresponding to the input image data from being executed. As a result, the density ununiformity over an entire surface can appropriately be corrected in correspondence with the screen condition, and when there is no correction value for appropriately correcting the density ununiformity corresponding to the screen condition, the correction is not executed with respect to the input image data. By this, since deterioration of the image quality caused by excessive correction is prevented, the image quality of an output image can be improved.

The operation display section 20 of the embodiment informs a user that the correction value corresponding to the screen condition of the input image data is not stored in the HDD 14. As a result, since the user can recognize that there is no optimum correction value corresponding to the screen condition of the image to be output, the user is prompted to store the correction value corresponding to the screen condition to be output, and convenience is enhanced.

The control section 10 of the embodiment first selects the correction value corresponding to at least the screen condition of the input image data among the correction values stored in the HDD 14 based on the determination result of the output condition of the input image data. When the plurality of selected correction values exist, the control section 10 reads any of the correction values from the HDD 14, and uses the same for correcting the input image data. As a result, it becomes possible to use an appropriate correction value corresponding to the screen condition of the input image data.

When the plurality of selected correction values exist, the control section 10 of the embodiment reads the correction value further corresponding to the sheet condition of the input image data, and uses the same for correcting the input image data. As a result, since the correction can be performed using the correction value corresponding to the screen condition and the sheet condition, the image quality of the output image can be improved.

The control section 10 of the embodiment stores the correction value together with the date-and-time information in the HDD 14. When the HDD 14 stores the plurality of correction values corresponding to the screen condition and the sheet condition of the input image data, the control section 10 reads from the HDD 14 the correction values further corresponding to the latest date-and-time information, and uses the same for correcting the input image data. As a result, even for the same output condition, the correction can be executed in view of an environment and a recent state of the image forming apparatus which is varied with time. Therefore, the image quality of the output image can be improved correspondingly to variation with time.

Since the control section 10 of the embodiment stores the correction value together with the date-and-time information in the HDD 14, it becomes possible to manage the correction value for example, and to enhance the convenience.

The control section 10 replicates the correction value stored in the HDD 14. Then, the control section 10 stores the replicated correction value in the HDD 14 separately from the original correction value. As a result, it becomes possible to back up the correction value, and to respond to disappearance of data caused by accidental trouble or change of the correction value, and thereby convenience is enhanced.

The control section 10 of the embodiment changes the correction value stored in the HDD 14 in accordance with the operation of the operation display section 20. As a result, it becomes possible to execute correction in accordance with preferences of a user or an error caused when measuring the stored correction value, and thereby convenience is enhanced.

When the correction value having the output condition same as that of the correction value stored in the HDD 14 is newly stored in the HDD 14, the control section 10 of the embodiment calculates the synthesized correction value by a predetermined calculation based on the correction value stored in the HDD 14 and the correction value which is newly stored. The control section 10 stores the calculated synthesized correction value in the HDD 14 in association with the output condition. As a result, it becomes possible to absorb an error generated when measuring the correction value and variation generated when outputting the measurement image, and thereby a correction value more precisely corrected can be stored.

The control section 10 of the embodiment selects whether to overwrite the synthesized correction value on the correction value stored in the HDD 14 or to store the synthesized correction value in the HDD 14 separately from the correction value stored in the HDD 14 in compliance with a predetermined request. As a result, it is possible to selectively use the correction value in accordance with a preference of a user or a state of the image forming apparatus. Therefore, the image quality of the output image can be improved and convenience is enhanced.

The control section 10 of the embodiment makes the image forming section 40 form the belt-like images P1 to P16 as well as the identification information Na capable of specifying the output condition on the sheet P, and output the measurement chart. As a result, since the output condition of the measurement chart can be easily specified, it is possible to easily associate between the correction value and the output condition at the time of storing.

Incidentally, the description in the embodiment of the present invention is one example of the image forming apparatus of the invention, and the invention is not limited to the same. The detailed structure and operation of each functional configuration constituting the image forming apparatus can also be changed appropriately.

Although the print condition is acquired when outputting the measurement chart to create the file based on the same in the embodiment, the print condition may be input when storing the calculated correction value. For example, as shown in FIG. 6, the operation display section 20 may be operated to manually input the print condition while seeing the print condition printed below the belt-like images P1 to P16. In this case, for example, it is possible to display a drop-down menu for allowing a user to select the print condition on the screen in which the print condition is input.

Figure 9A:
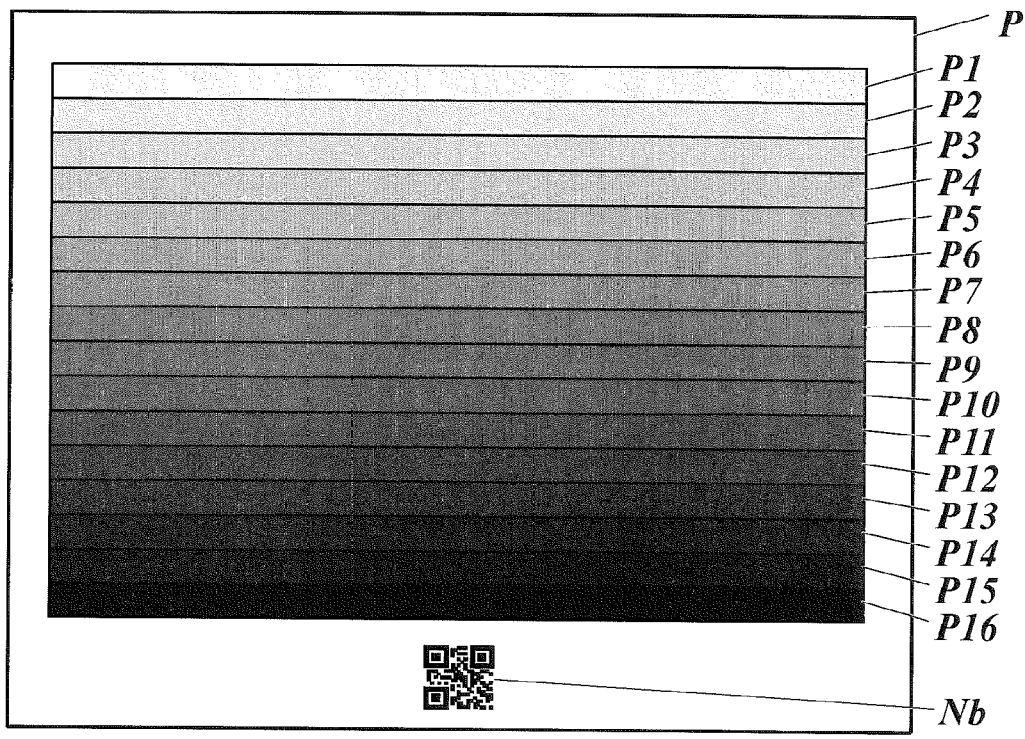
FIG. 9A is a diagram for explaining other mode of the measurement chart.

As shown in FIG. 9A, a two-dimensional cord Nb for specifying the print condition may be printed below the belt-like images P1 to P16. In this case, a predetermined reader may be connected to the image forming apparatus 1, and the reader may read the two-dimensional cord Nb to obtain the print condition.

Figure 9B:
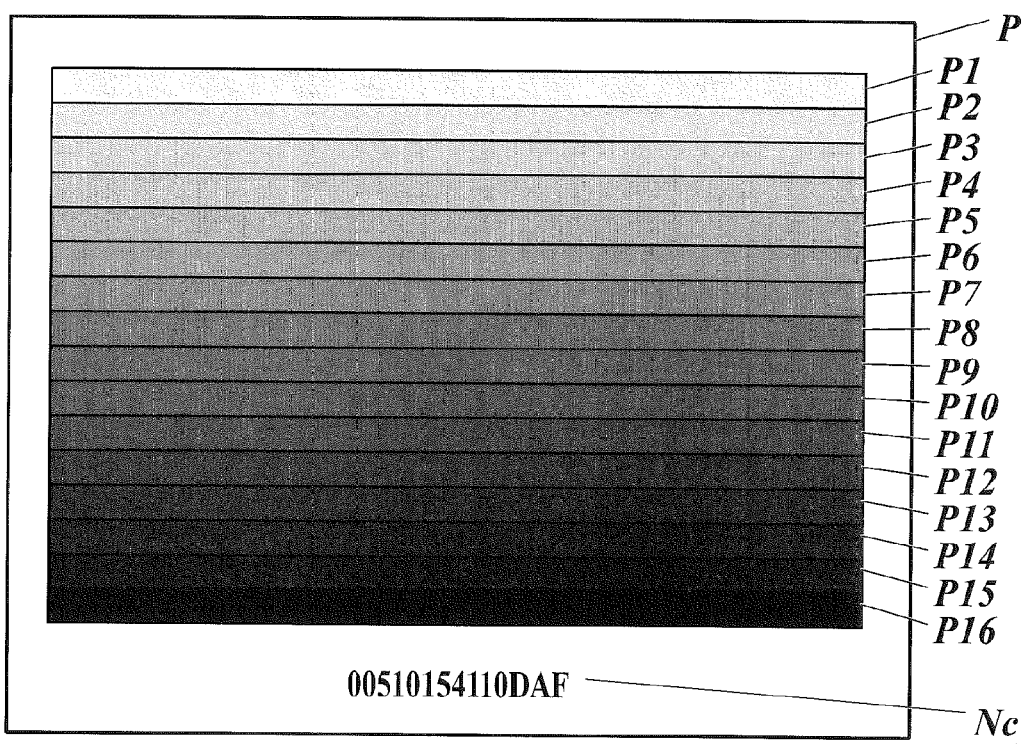
FIG. 9B is a diagram for explaining other mode of the measurement chart.

Further, as shown in FIG. 9B, character cords Nc for specifying the print condition may be printed below the belt-like images P1 to P16. In this case, it is possible to employ such a configuration that when the operation display section 20 is operated to input the character cord, the print condition corresponding to the input character cord is determined in the control section 10.

It is possible to employ any modes of the identification information for specifying the print condition to be printed on a measurement chart as long as the print condition can be specified.

The identification information can be read by the image reading section 30.

The identification information such as cords and character information for specifying the print condition may not be printed.

Although the correction value is stored in association with the kinds of screen processing, the kinds of sheets, and the recording dates and times in the embodiment, also other conditions may be set arbitrary as long as the correction value is stored in association with at least kinds of screen processing.

Although the date and time when the correction value is stored in the HDD 14 is acquired and associated with the correction value in the embodiment, the date and time when the measurement chart is output may be acquired and associated with the correction value.

In the embodiment, when there is no correction value correlated to the matched kind of screen processing, a user is informed of this fact. Alternatively, a message informing that there is no correction value correlated to the matched kind of screen processing may be output to a device, such as a personal computer, other than the image forming apparatus 1. A user may not be informed of the message informing that there is no correction value correlated to the matched kind of screen processing.

Although the stored correction value can be replicated in the embodiment, the apparatus may not have such a function.

Although the correction value can be changed using the operation display section 20 in the embodiment, the correction value may be changed by outside operation, for example by a personal computer. The apparatus may not have the function for changing the correction value.

Although the image forming apparatus 1 inputs the image density measured by the colorimetric device 800 to calculate the correction value based on the image density in the embodiment, the device other than the colorimetric device 800 may measure the image density. For example, it is possible to employ such a configuration that an image density measuring section for measuring the image density is provided on the conveying section downstream from the fixing section of the image forming apparatus 1, the density of the measurement image of the measurement chart where the measurement image has been formed on the sheet and has been subjected to the fixing processing by the fixing section is measured by the image density measuring section, and the control section 10 inputs the measurement result to calculate the correction value.

The image reading section 30 may read to the measurement image to measure the image density.

Although the embodiment uses a hard disk drive or a semiconductor nonvolatile memory as a computer readable medium of a program according to the present invention, the invention is not limited to this example. A portable recording medium such as a CD-ROM can be used as another computer readable medium. A carrier wave may be used as a medium which provides the program data of the invention through a communication line.

The present U.S. patent application claims a priority under the Paris Convention of Japanese patent application No. 2010-074351 filed on 29 Mar. 2010, which shall be a basis of correction of an incorrect translation.

What is claimed is:

1. An image forming apparatus comprising:
a storing section to store predetermined information,
an image forming section to form a measurement image on a sheet to output a measurement chart, and
a control section to receive inputs of a plurality of pieces of density information respectively indicating densities at a plurality of positions of the measurement image formed on the sheet, to calculate a correction value corresponding to each of the positions based on the input density information, to store in the storing section at least one calculated correction value in association with an output condition including a screen condition indicating a content of a screen processing at the time of outputting the measurement chart, to determine the output condition of the input image data, to read the correction value corresponding to the determined output condition from the storing section, and to correct the input image data based on the read correction value, wherein the image forming section forms an image on the sheet based on the corrected image data, and
when no correction value corresponding to the screen condition of the input image data is stored in the storing section, the control section inhibits the correction corresponding to the input image data from being executed.

2. The image forming apparatus of claim 1, further comprising an informing section to inform that no correction value corresponding to the screen condition of the input image data is stored in the storing section.

3. The image forming apparatus of claim 1, wherein
the number of the at least one correction value stored in the storing section is two or more, and
the control section first selects at least one correction value corresponding to at least the screen condition of the input image data among the correction values stored in the storing section based on a determination result of the output condition of the input image data, and when the number of the at least one selected correction values is two or more, reads any of the correction values from the storing section and uses the read correction value for correction of the input image data.

4. The image forming apparatus of claim 3, wherein
the output condition further includes a sheet condition indicating a kind of the sheet, and
when the number of the at least one selected correction values is two or more, the control section reads from the storing section at least one correction value which further corresponds to the sheet condition of the input image data, and uses the read correction value for correction of the input image data.

5. The image forming apparatus of claim 4, wherein the control section stores the correction values together with date-and-time information in the storing section, and when the number of the at least one correction data which is stored in the storing section and corresponds to the screen condition and the sheet condition of the input image data is two or more, reads the correction value which further corresponds to latest date-and-time information from the storing section to use the read correction value for correction of the input image data.

6. The image forming apparatus of claim 1, wherein the control section stores the correction value together with date-and-time information in the storing section.

7. The image forming apparatus of claim 1, wherein the control section replicates the correction value stored in the storing section, and stores the replicated correction value in the storing section separately from the original correction value.

8. The image forming apparatus of claim 1, further comprising:
an operating section which can be operated by a user, wherein
the control section changes the correction value stored in the storing section in accordance with operation by the operating section.

9. The image forming apparatus of claim 1, wherein when the correction value whose output condition is same as the correction value stored in the storing section is newly stored in the storing section, the control section calculates a synthesized correction value by a predetermined calculation based on the correction value stored in the storing section and the correction value which is newly stored, and stores the calculated synthesized correction value in the storing section in association with the output condition.

10. The image forming apparatus of claim 9, wherein the control section selects whether the synthesized correction value should be overwritten on the correction value stored in the storing section or the synthesized correction value should be stored in the storing section separately from the correction value stored in the storing section in compliance with a predetermined request.

11. The image forming apparatus of claim 1, wherein the control section makes the image forming section form the measurement image and identification information capable of specifying the output condition on the sheet to output the measurement chart.

* * * * *